United States Patent [19]
Perén et al.

[11] 3,971,091
[45] July 27, 1976

[54] AUTOMATIC APPARATUSES, ROBOTS AND THE LIKE

[75] Inventors: Karl Gunnar Magnus Perén, Saltsjobaden; Stig Åke Gösta Svensson, Sodertalje, both of Sweden

[73] Assignee: AB Profila, Norrkoping, Sweden

[22] Filed: May 29, 1974

[21] Appl. No.: 474,339

[30] Foreign Application Priority Data
May 30, 1973 Sweden............................ 7307708

[52] U.S. Cl................................ 15/49 R; 15/312 R
[51] Int. Cl.² ........................................... A47L 11/22
[58] Field of Search................ 15/49 R, 312 A, 54, 15/DIG. 2; 104/91, 111, 118

[56] References Cited
UNITED STATES PATENTS

| | | | |
|---|---|---|---|
| 570,339 | 10/1896 | Roberts, Jr. | 15/54 |
| 3,245,103 | 4/1966 | King, Jr. | 15/312 A |
| 3,348,254 | 10/1967 | Storm, Jr. | 15/49 R |
| 3,540,153 | 11/1970 | Aoki | 104/91 |

Primary Examiner—Richard E. Aegerter
Assistant Examiner—L. Footland
Attorney, Agent, or Firm—Karl W. Flocks

[57] ABSTRACT

An automatic apparatus or robot preferably intended for cleaning floors or like surfaces in such premises and within such regions, where one cannot for special reasons utilize conventional apparatuses or machines. The automatic apparatus or robot includes a unit which is spaced from the apparatus proper, drivable along a track spaced from the floor or like surface, and coupled with the apparatus to steer and tow it.

3 Claims, 4 Drawing Figures

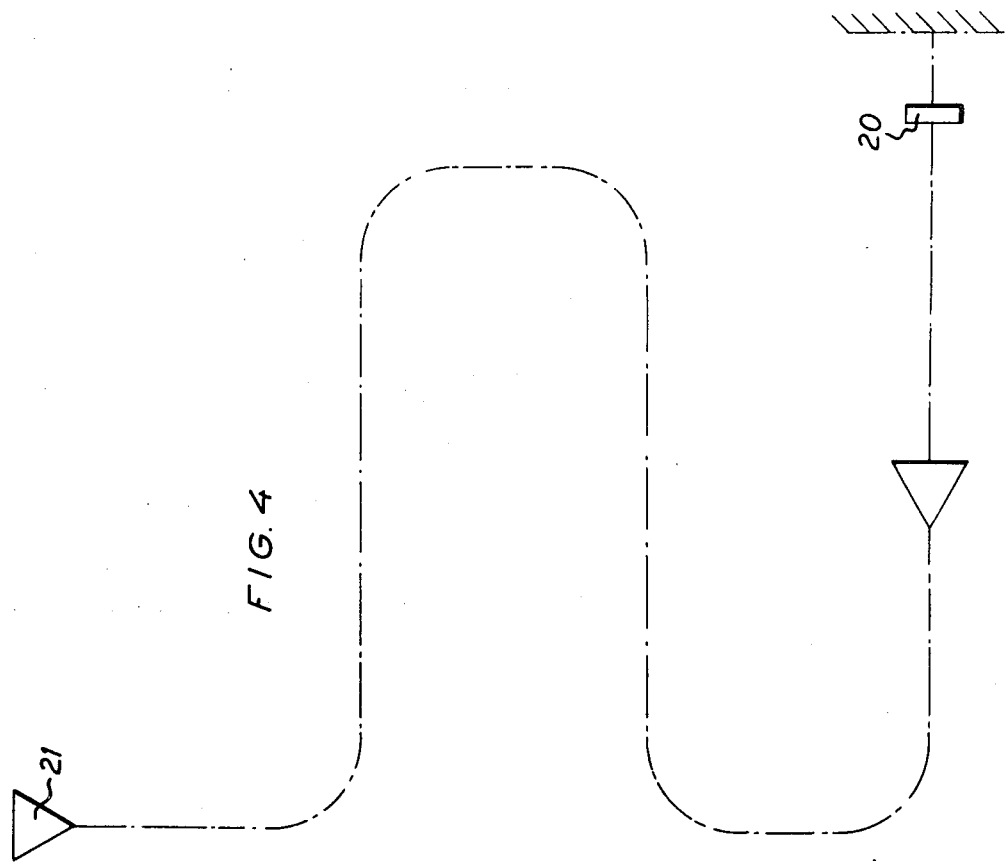
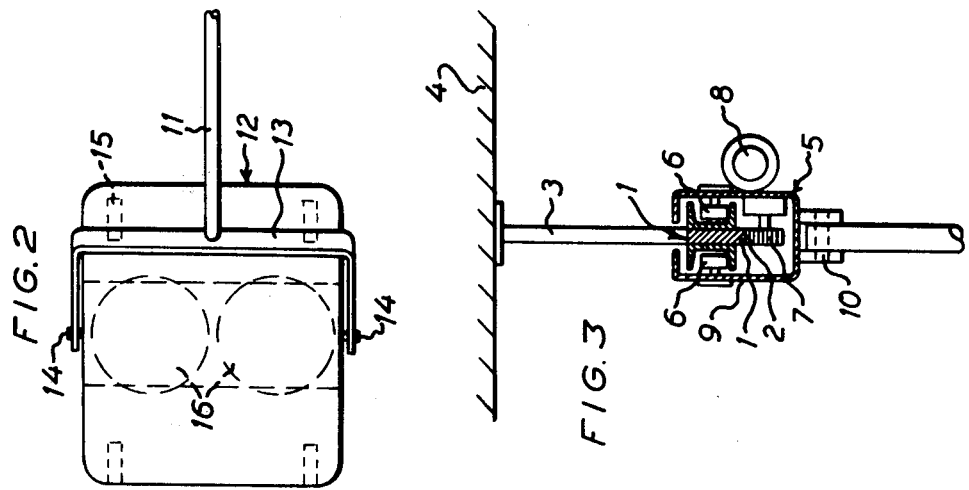

AUTOMATIC APPARATUSES, ROBOTS AND THE LIKE

This invention relates to an automatic apparatus or robot which is primarily intended for cleaning floor and like surfaces and including cleaning implements carried by the apparatus or robot moving over the surface in question.

Self-propelled sweeping machines, vacuum cleaners, scrapers and other machines for cleaning premises are previously known. Such machines also include manure clearing apparatuses.

In premises where troublesome environmental problems prevail, such as certain types of industries, cattle sheds and other premises with moist and/or heavily oppressive conditions it has proved difficult to maintain the operational reliability of electric motors and associated apparatuses.

Besides, the self-propelled apparatuses as hitherto suggested for the purposes indicated have been manually controlled which has entailed the need of an operator.

One object of the present invention is to provide a self-propelled apparatus or robot of the kind contemplated, which is essentially independent of the conditions prevailing at the level of the surface to be worked.

Another object of the invention is to provide a machine which is self-conducting along a predetermined path.

According to the invention, the apparatus or robot for its advance is coupled with a motor-actuated driving and steering unit spaced from the machine proper and adapted to travel along a guide track spaced from the floor or like surface.

An embodiment of the invention will be more fully described hereinbelow and with reference to the accompanying drawings in which FIG. 1 is a side elevation of the terminal section of a guide track along which the automatic apparatus or robot is to travel;

FIG. 2 is a top plan view of the apparatus proper;

FIG. 3 is a cross section of the driving unit of the apparatus and the guide track;

FIG. 4 is a diagrammatic view of the extension of an assumed working path.

Figure 1:
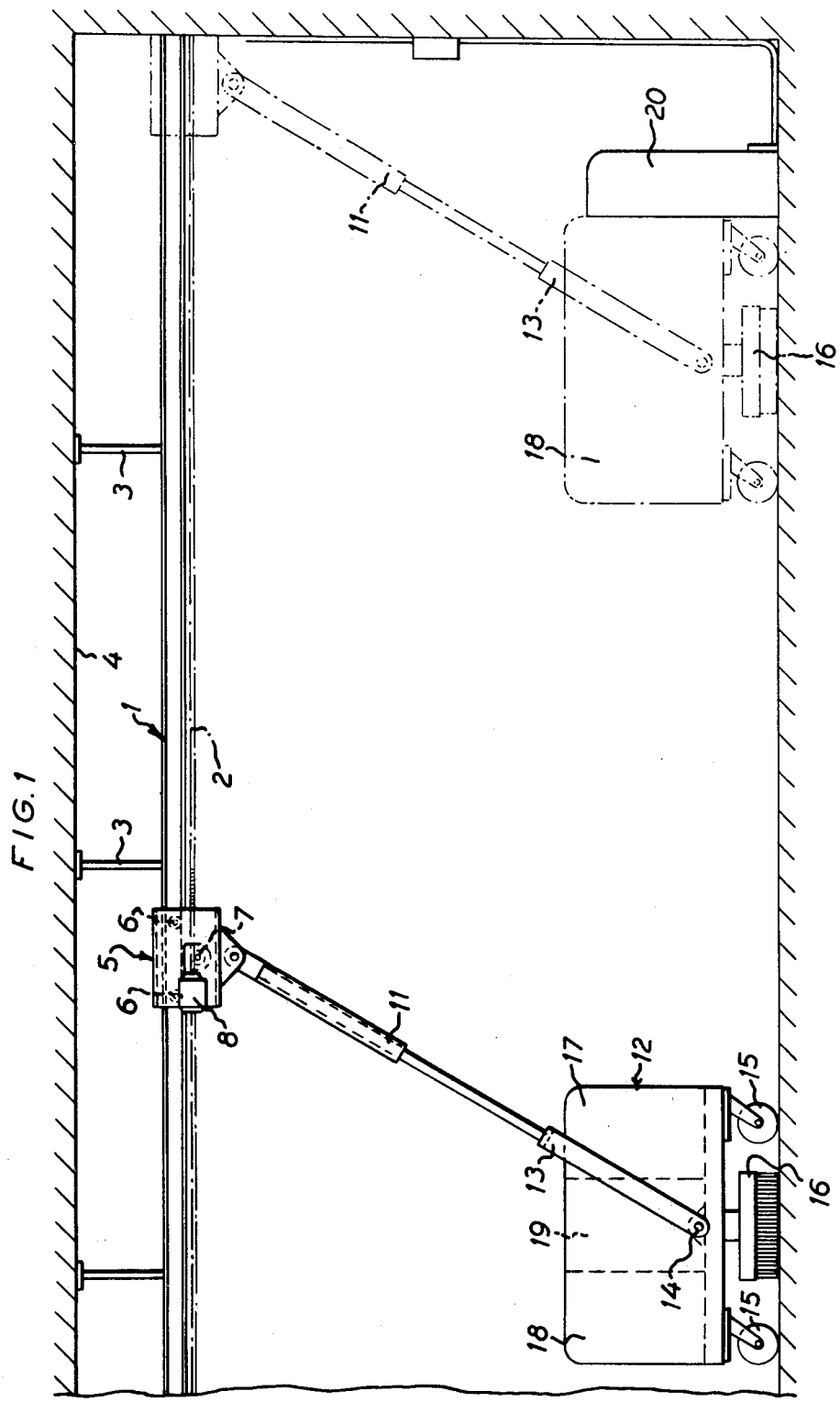

The guide track comprises a rail 1 with an associated rack 2 which may preferably be of plastic material. In the embodiment illustrated, the rack is arranged directly beneath the web of the rail which has the profile of a recumbent H, although other profiles may of course also be used. The rail 1 is suspended by support means 3 in an appropriate way from the ceiling 4 of the premises or other building parts suited for the purpose. Out of doors the rail can be carried by posts or like means.

The automatic apparatus or robot includes a driving and steering unit 5 comprising two pairs of wheels 6 which run between the flanges of the rail 1, and a gear wheel 7 which is in mesh with the rack 2 and is driven via a transmission by a reversible electric motor 8. A coupling 10 for a drawbar and steering rod 11 is mounted to a casing 9 in which the wheels of the driving and steering unit are arranged and which carries the drive motor and its transmission. The rod 11 connects the driving and steering unit 5 with the automatic apparatus or robot which is generally designated 12. The rod 11 comprises at least two telescoping parts and at the lower rod part there is arranged a yoke 13 straddling the apparatus 12. The yoke is connected by pivots 14 to the apparatus frame at the middle portion thereof. The lengths of the rod 11 and the yoke 13 are so dimensioned that the yoke and the rod are inclined forwardly in the direction of travel, when the apparatus is towed by the unit 5. By reason of its telescoping action the rod can be shortened upon change of travelling direction, so that the unit 5 can pass above the apparatus 12, which is then at a standstill, to a position in which the rod and the yoke are inclined in the opposite direction.

The apparatus 12 illustrated, which is carried by caster-type wheels 15, is provided with rotary brushes 16, a suction assembly 17 (only generally shown), a removable refuse container 18, and a space 19 for batteries driving the motor 8 and the motors for the suction assembly, brushes etc. In lieu of the brushes illustrated the apparatus can have scrapers and like means.

As an alternative the apparatus may also be taken into consideration as a vehicle for internal transport.

For certain special purposes the wheels 15 of the apparatus 12 may be replaced or supplemented by e.g. runners or other supporting means.

FIG. 1 diagrammatically shows at the end of the track a charging unit 20 to which the apparatus is intended to be automatically connected when it reaches the extreme end of the track. In the charging unit, the apparatus itself or the driving and steering unit 5 there may be provided automatically operating devices which, when the apparatus reaches the extreme position, are adapted to actuate the motor of the apparatus directly or after a given period of rest, to cause it to travel again along the track. A similar charging unit may be provided at the other end of the track, but as a rule it will be sufficient to have a device 21 which reverses the direction of travel of the drive motor for an immediate or delayed re-run.

It goes without saying that the track may be given a configuration other than that illustrated. It is possible to have a circuitous track in which wherever appropriate the charging unit is arranged at a branch line or as a stop station of the track. The charging unit need not necessarily be located at floor level but may be arranged at an optional location, the connecting means being placed on a level with the apparatus 12 or on a level with the guide rail.

Even though operation by batteries will be preferable in most cases, it might be imagined that the motor is supplied with electric power from lines running along the guide track. In shorter tracks the line can be a fixedly connected, windable and unwindable cable or like means, and in longer tracks a trolley wire and collector shoe devices may be used.

The following advantages are gained by the apparatus according to the invention. The drive motor and the drive wheels and the like can be located on a level where they are not influenced by the environmental conditions on the working level of the machine, and the apparatus fully automatically carries out its functions along a predetermined path.

The guide track can be run in very sharp curves since the driving and steering unit is of small format and insignificant length. As a result, the working track described by the apparatus can be formed in the most varying ways. The utilization of casters with the apparatus 12 enables it to follow a very complicated track pattern, and at the same time the rigid rod 12 and the yoke 13 ensure that the tools or implements of the apparatus always occupy the correct position with regard to the direction of travel when the machine is moving.

The invention must not be considered limited to the embodiment described above and illustrated in the drawings but can be modified in several ways within the spirit and scope of the appended claims.

What we claim and desire to secure by Letters Patent is:

1. An automatic apparatus primarily intended for cleaning floors and like surfaces and including a motor-actuated driving and steering unit, a guide track, a rod means, a yoke, and cleaning implements carried by the apparatus moving over the surface in question, wherein the apparatus proper for its advance is coupled with said motor-actuated driving and steering unit which is spaced from the machine proper and adapted to travel along said guide track which is spaced from the floor or like surface, said driving and steering unit and the apparatus proper connected by said yoke pivotally mounted to the apparatus and said rod means comprising one rod rigidly connected with said yoke and another rod mounted for swinging movement at said driving and steering unit, the length of said rod means being so dimensioned that said rod means will occupy a position inclined forwardly in the direction of travel, and said rod means being of the telescoping type to permit said driving and steering unit to move in the opposite direction of travel over and past the apparatus proper to a position in which said extended telescoping rod again tows the apparatus.

2. An automatic apparatus as claimed in claim 1, wherein the driving and steering unit comprises an electric drive motor which is adapted to be supplied with electric power from a battery assembly carried by the apparatus located on the floor surface.

3. An automatic apparatus as claimed in claim 1, wherein the driving and steering unit includes at least one driven gear wheel which is adapted to mesh with a rack arranged to extend along the guide track.

* * * * *